US012005887B2

(12) United States Patent
Okita et al.

(10) Patent No.: US 12,005,887 B2
(45) Date of Patent: Jun. 11, 2024

(54) DRIVER ASSISTANCE DEVICE, DRIVER ASSISTANCE METHOD, AND NON-TRANSITORY COMPUTER-READABLE STORAGE MEDIUM STORING PROGRAM

(71) Applicant: TOYOTA JIDOSHA KABUSHIKI KAISHA, Toyota (JP)

(72) Inventors: Toshinori Okita, Gotenba (JP); Yuki Kawasaki, Susono (JP); Youhei Masui, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 17/696,275

(22) Filed: Mar. 16, 2022

(65) Prior Publication Data

US 2022/0297671 A1 Sep. 22, 2022

(30) Foreign Application Priority Data

Mar. 19, 2021 (JP) ................................. 2021-045825

(51) Int. Cl.
*B60W 30/045* (2012.01)
*B60W 40/068* (2012.01)
*B60W 40/10* (2012.01)

(52) U.S. Cl.
CPC ........ *B60W 30/045* (2013.01); *B60W 40/068* (2013.01); *B60W 40/10* (2013.01);
(Continued)

(58) Field of Classification Search
CPC .. B60W 30/045; B60W 40/068; B60W 40/10; B60W 2552/30; B60W 2552/40; B60W 2554/802; B60W 2555/20; B60W 2720/106; B60W 2050/143; B60W 30/18145; B60W 50/14; B60W 2554/804;
(Continued)

(56) References Cited

U.S. PATENT DOCUMENTS

2005/0216162 A1* 9/2005 Suzuki ............... B60K 31/0083
701/70
2009/0192675 A1* 7/2009 Yamakado ...... B60W 30/18145
701/38
(Continued)

FOREIGN PATENT DOCUMENTS

EP 2712780 A1 * 4/2014 .......... B60T 8/17555
JP 2015-120363 A 7/2015

*Primary Examiner* — Jelani A Smith
*Assistant Examiner* — Alyssa Rorie
(74) *Attorney, Agent, or Firm* — Dinsmore & Shohl LLP

(57) ABSTRACT

A driver assistance device includes a processor. The processor is configured to: automatically decelerate an own vehicle in accordance with a relative relation between the own vehicle and a vehicle traveling ahead that is traveling forward of the own vehicle; change deceleration of the own vehicle by a first change amount, or a second change amount that is larger than the first change amount, when automatically decelerating the own vehicle; perform behavioral determination to estimate whether behavior of the own vehicle will become unstable when the own vehicle is automatically decelerated; and change the deceleration by the first change amount when automatically decelerating the own vehicle, when the behavior of the own vehicle is estimated to become unstable.

11 Claims, 2 Drawing Sheets

(52) U.S. Cl.
CPC ..... *B60W 2552/30* (2020.02); *B60W 2552/40* (2020.02); *B60W 2554/802* (2020.02); *B60W 2555/20* (2020.02); *B60W 2720/106* (2013.01)

(58) Field of Classification Search
CPC .... B60W 30/16; B60W 30/143; B60W 30/02; B60W 50/0098; B60W 2050/0043; B60W 2720/10
See application file for complete search history.

(56) References Cited

U.S. PATENT DOCUMENTS

| | | |
|---|---|---|
| 2015/0175160 A1 | 4/2015 | Yoshinaga et al. |
| 2017/0225689 A1* | 8/2017 | Mukai .................. B60W 20/40 |
| 2019/0202473 A1* | 7/2019 | Kaji ..................... B60W 50/12 |
| 2020/0156638 A1* | 5/2020 | Rei ...................... B60W 30/02 |
| 2021/0070291 A1* | 3/2021 | Yu ...................... B60W 40/107 |

\* cited by examiner

DRIVER ASSISTANCE DEVICE, DRIVER ASSISTANCE METHOD, AND NON-TRANSITORY COMPUTER-READABLE STORAGE MEDIUM STORING PROGRAM

CROSS-REFERENCE TO RELATED APPLICATION

This application claims priority to Japanese Patent Application No. 2021-045825 filed on Mar. 19, 2021, incorporated herein by reference in its entirety.

BACKGROUND

1. Technical Field

The disclosure relates to a driver assistance device, a driver assistance method, and a non-transitory computer-readable storage medium storing a program.

2. Description of Related Art

As this type of device, there is proposed, for example, a device that controls inter-vehicle distance between an own vehicle and a vehicle traveling ahead, and that calculates a degree of collision risk felt by a driver when another vehicle cuts in ahead or a target inter-vehicle distance to the vehicle traveling ahead is switched, such that the higher the calculated degree of collision risk is, the greater the jerk generated to decelerate the own vehicle is (see Japanese Unexamined Patent Application Publication No. 2015-120363 (JP 2015-120363 A)).

SUMMARY

However, when the own vehicle suddenly decelerates as a result of setting a relatively large jerk only because the collision risk is relatively high, for example, there is a possibility that the behavior of the own vehicle will become unstable. That is to say, there is room for improvement in the technology described in JP 2015-120363 A.

The disclosure has been made in view of the above circumstances, and it is an object thereof to provide a driver assistance device and method, and a computer program, capable of appropriately decelerating the own vehicle while suppressing the behavior of the own vehicle from becoming unstable.

An aspect of the present disclosure relates to a driver assistance device including a processor. The processor is configured to: automatically decelerate an own vehicle in accordance with a relative relation between the own vehicle and a vehicle traveling ahead that is traveling forward of the own vehicle; change deceleration of the own vehicle by a first change amount, or a second change amount that is larger than the first change amount, when automatically decelerating the own vehicle; perform behavioral determination to estimate whether behavior of the own vehicle will become unstable when the own vehicle is automatically decelerated; and change the deceleration by the first change amount when automatically decelerating the own vehicle, when the behavior of the own vehicle is estimated to become unstable.

An aspect of the present disclosure relates to a driver assistance method for a vehicle. The vehicle is configured to automatically decelerate the vehicle in accordance with a relative relation between the vehicle and a vehicle traveling ahead that is traveling forward of the vehicle, and change deceleration of the vehicle by a first change amount, or a second change amount that is larger than the first change amount, when automatically decelerating the vehicle. The driver assistance method includes: estimating whether behavior of the vehicle will become unstable when the vehicle automatically decelerates; and changing the deceleration by the first change amount when automatically decelerating the vehicle, when the behavior of the vehicle is estimated to become unstable.

An aspect of the present disclosure relates to a non-transitory computer-readable storage medium storing a program. The program, when executed by a processor of a driver assistance device configured to automatically decelerate a vehicle in accordance with a relative relation between the vehicle and a vehicle traveling ahead that is traveling forward of the vehicle, causes the driver assistance device to: change deceleration of the vehicle by a first change amount, or a second change amount that is larger than the first change amount, when automatically decelerating the vehicle; estimate whether behavior of the vehicle will become unstable when the vehicle automatically decelerates; and change the deceleration by the first change amount when automatically decelerating the vehicle, when the behavior of the vehicle is estimated to become unstable.

In the driver assistance device and method, and the computer program, the behavioral stability of the own vehicle is also taken into consideration in addition to the relative relation between the own vehicle and the vehicle traveling ahead. Thus, according to the driver assistance device and method, and the computer program, the own vehicle can be appropriately decelerated while suppressing the behavior of the own vehicle from becoming unstable due to the deceleration of the own vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
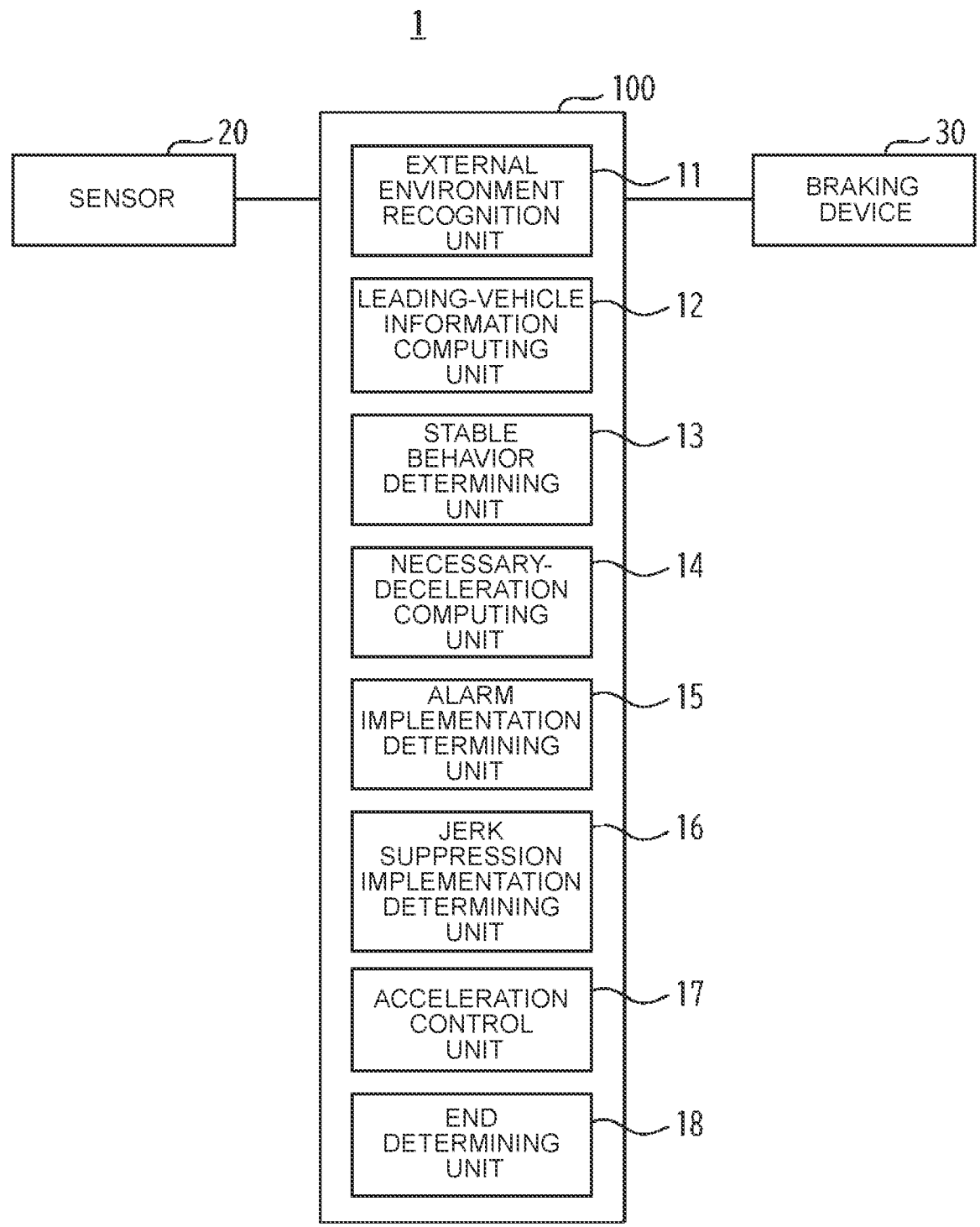
FIG. 1 is a block diagram illustrating a configuration of a driver assistance device according to an embodiment.

An embodiment relating to a driver assistance device will be described with reference to FIGS. 1 and 2. In FIG. 1, a driver assistance device 100 according to the embodiment is installed in a vehicle 1 (omitted from illustration). The driver assistance device 100 can cause the vehicle 1 to travel so as to follow a vehicle traveling ahead, which is another vehicle traveling forward of the vehicle 1, in the course of travel thereof. That is to say, the driver assistance device 100 is configured to be capable of executing following type adaptive cruise control (ACC). The driver assistance device 100 is configured to be capable of implementing deceleration assistance control in which a braking device 30 of the vehicle 1 is used for automatic deceleration of the vehicle 1, for example, in order to control the inter-vehicle distance between the vehicle 1 and the vehicle traveling ahead, for example, in accordance with to the relative relation between the vehicle 1 and the vehicle traveling ahead while executing following type ACC.

Note that in the present embodiment, a form in which deceleration assistance control is implemented during execution of following type ACC is given as an example, but this is not limiting.

In order to realize the deceleration assistance control, the driver assistance device 100 is configured including, as processing blocks that are logically realized or as processing circuits that are physically realized therein, an external environment recognition unit 11, a leading-vehicle information computing unit 12, a stable behavior determining unit 13, a necessary-deceleration computing unit 14, an alarm implementation determining unit 15, a jerk suppression implementation determining unit 16, an acceleration control unit 17, and an end determining unit 18.

Here, a sensor 20 that the vehicle 1 is provided with includes sensors for recognizing the external environment of the vehicle 1, such as for example, radar, light detection and ranging (LiDAR), a camera, and so forth, and sensors that detect motion states of the vehicle 1, such as a speed sensor, an acceleration sensor, a yaw rate sensor, and so forth, for example.

The external environment recognition unit 11 acquires the measurement results from the sensors for recognizing the external environment of the vehicle 1 included in the sensor 20. Further, the external environment recognition unit 11 may acquire, for example, intelligent transport system (ITS) information. The external environment recognition unit 11 may acquire information from another vehicle traveling nearby the vehicle 1 by vehicle-to-vehicle communication, for example.

The external environment recognition unit 11 recognizes the external environment of the vehicle 1 based on the acquired measurement results, ITS information, and so forth. Examples of the external environment include objects such as other vehicles, obstructions, and so forth, meteorological conditions such as air temperature, rainfall, and so forth, information regarding the road surface such as road marking lines, road surface temperature, and so forth, and so on. Note that various existing methods can be applied as the method of recognizing the external environment, and accordingly detailed description thereof will be omitted.

When recognizing a vehicle traveling ahead (i.e., another vehicle traveling forward of the vehicle 1 in the course of travel thereof) by the external environment recognition unit 11, the leading-vehicle information computing unit 12 computes the leading-vehicle information related to the vehicle traveling ahead.

Specifically, the leading-vehicle information computing unit 12 may compute reliability, for example, as the leading-vehicle information. Here, "reliability" may be an index indicating certainty that a vehicle traveling ahead is present. Such reliability may be computed based on determination results such as, for example, (i) whether the vehicle traveling ahead is detected by a plurality of types of sensors included in the sensor 20, (ii) whether the vehicle traveling ahead is continuously detected by at least one sensor included in the sensor 20, (iii) whether the vehicle traveling ahead is continuously a control object for the deceleration assistance control described above, and so forth.

Alternatively, "reliability" may be an index indicating the certainty that the vehicle traveling ahead is present in the same lane as the lane in which the vehicle 1 is traveling. Such reliability may be computed based on, for example, (i) results of comparison between the position of the vehicle traveling ahead that is predicted from the recognition results and so forth of the external environment recognition unit 11 and the predicted course of the vehicle 1, (ii) determination results of whether a vehicle traveling ahead is present between road marking lines (in other words, lane marking lines that define the lane) recognized by the external environment recognition unit 11, and so forth.

The stable behavior determining unit 13 determines whether the behavior of the vehicle 1 will become unstable when a relatively large braking force is applied to the vehicle 1, based on the recognition results from the external environment recognition unit 11 (e.g., road marking lines, road surface temperature, etc.), measurement results of the sensors included in the sensor 20 for detecting the motion state of the vehicle 1 (e.g., speed, yaw rate, acceleration, etc.), estimated friction coefficient of the road surface, and so forth.

For example, when lateral-direction gripping force of the vehicle 1 exceeds the road surface frictional force due to at least one of braking and turning of the vehicle 1, the behavior of the vehicle 1 will become unstable. In particular, when braking and turning of the vehicle 1 are performed at the same time, the behavior of the vehicle 1 tends to become unstable.

The stable behavior determining unit 13 may determine that the behavior of the vehicle 1 will become unstable when a relatively large braking force is applied to the vehicle 1, in the event of a first condition that "the turning state amount related to the vehicle 1 is no less than a first predetermined value", for example, being satisfied. Note that the turning state amount can be estimated based on the yaw rate, lateral acceleration, turning curvature (i.e., a value obtained by dividing the yaw rate by the speed), and so forth, of the vehicle 1. Various existing methods can be applied as the method of estimating the turning state amount, and accordingly detailed description thereof will be omitted.

The stable behavior determining unit 13 may determine that the behavior of the vehicle 1 will become unstable when a relatively large braking force is applied to the vehicle 1, in the event of a second condition that "the estimated friction coefficient of the road surface is no more than a second predetermined value and/or the road surface temperature is no more than a third predetermined value", for example, being satisfied.

The stable behavior determining unit 13 may determine that the behavior of the vehicle 1 will become unstable when a relatively large braking force is applied to the vehicle 1, in the event of a third condition that "a curve having a curvature no less than a fourth predetermined value is present ahead on the planned route of the vehicle 1" being satisfied, for example.

The stable behavior determining unit 13 may determine that the behavior of the vehicle 1 will become unstable when a relatively large braking force is applied to the vehicle 1, in the event of one condition out of the first to the third conditions being satisfied. Alternatively, the stable behavior determining unit 13 may determine that the behavior of the vehicle 1 will become unstable when a relatively large braking force is applied to the vehicle 1, in the event of a plurality of conditions out of the first to the third conditions being satisfied.

The necessary-deceleration computing unit 14 computes the necessary deceleration in accordance with the relative relation between the vehicle 1 and the vehicle traveling ahead (e.g., relative position, relative speed, etc.), when the vehicle 1 is to be decelerated by the deceleration assistance control described above. The necessary deceleration may be a deceleration for bringing the relative speed between the vehicle 1 and the vehicle traveling ahead to zero, within a range of the inter-vehicle distance obtained from the relative positions of the vehicle 1 and the vehicle traveling ahead, for example. The necessary-deceleration computing unit 14 further determines whether collision of the vehicle 1 with the vehicle traveling ahead can be circumvented when the deceleration of the vehicle 1 is changed by a predetermined jerk to the computed deceleration.

The alarm implementation determining unit 15 determines whether to issue an alarm, based on the relative positional relation between the vehicle 1 and the vehicle traveling ahead, the magnitude of the deceleration computed by the necessary-deceleration computing unit 14, and so forth, for example.

The jerk suppression implementation determining unit 16 determines whether the jerk suppression can be relaxed, based on at least one of the reliability as an example of the leading-vehicle information computed by the leading-vehicle information computing unit 12, the determination results of the stable behavior determining unit 13, and the determination results of the necessary-deceleration computing unit 14.

Now, "jerk suppression" will be described. A restriction is set for the jerk (that is, the first time derivative of acceleration) in the deceleration assistance control described above. Accordingly, fluctuation per time unit of deceleration (i.e., negative acceleration) when the vehicle 1 is decelerated by the deceleration assistance control is suppressed. Providing such jerk restriction is referred to as "jerk suppression" in the present embodiment. By implementing jerk suppression, for example, stability of the behavior of the vehicle 1 can be improved, and occupants of the vehicle 1 can be suppressed from feeling discomfort. Relaxing jerk suppression means relaxing or eliminating the restrictions placed on the jerk.

The acceleration control unit 17 transmits information indicating physical quantities to be realized (e.g., braking force, output torque, engine revolutions, etc.), to one or a plurality of components that actually change the behavior of the vehicle 1, such as the braking device 30, an engine control device (omitted from illustration), and so forth, of the vehicle 1, for example.

Note that when another system that performs control relating to acceleration/deceleration of the vehicle 1 is installed in the vehicle 1 in addition to the driver assistance device 100, and an arbitrating unit that performs arbitration between the driver assistance device 100 and the other system is present in the vehicle 1, the acceleration control unit 17 may transmit information indicating the deceleration that the deceleration assistance control described above requests, to the arbitration unit. In this case, the arbitrating unit may transmit information indicating physical quantity to be realized to one or a plurality of components that actually change the behavior of the vehicle 1.

While the above-described deceleration assistance control is being implemented, the end determining unit 18 determines whether to end the deceleration assistance control, based on the relative relation between the vehicle 1 and the vehicle traveling ahead, estimated from the recognition results of the external environment recognition unit 11 and so forth.

Next, the operations of the driver assistance device 100 will be described with reference to the flowchart of FIG. 2.

Figure 2:
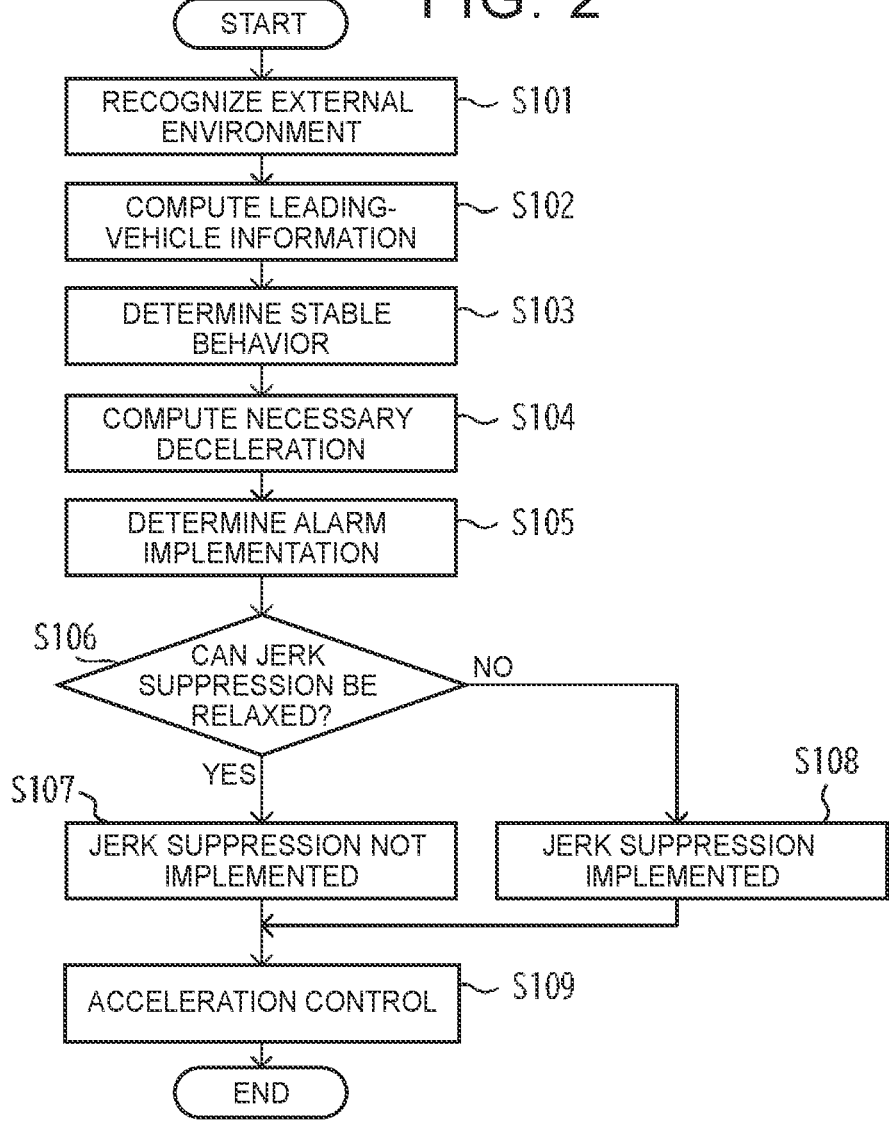
FIG. 2 is a flowchart showing operations of the driver assistance device according to the embodiment.

In FIG. 2, the external environment recognition unit 11 recognizes the external environment (step S101). Next, the leading-vehicle information computing unit 12 computes the leading-vehicle information based on the recognition results from the external environment recognition unit 11 (step S102).

In parallel with, or successively before or after the processing of step S102, the stable behavior determining unit 13 determines whether the behavior of the vehicle 1 will become unstable when a relatively large braking force is applied to the vehicle 1 (step S103). Following the processing of step S102, the necessary-deceleration computing unit 14 computes the necessary deceleration in accordance with the relative relation between the vehicle 1 and the vehicle traveling ahead (step S104). At this time, the necessary-deceleration computing unit 14 determines whether collision of the vehicle 1 with the vehicle traveling ahead can be circumvented when deceleration of the vehicle 1 is changed while implementing jerk suppression (i.e., in a state with restriction applied to the jerk) and changing the jerk, up to the computed deceleration. Next, the alarm implementation determining unit 15 determines whether to issue an alarm (step S105).

Next, the jerk suppression implementation determining unit 16 determines whether the jerk suppression can be relaxed, based on at least one of the reliability as an example of the leading-vehicle information computed by the leading-vehicle information computing unit 12, the determination results of the stable behavior determining unit 13, and the determination results of the necessary-deceleration computing unit 14 (step S106).

When determination is made in the processing of step S106 that the jerk suppression can be relaxed (Yes in step S106), the jerk suppression implementation determining unit 16 transmits a signal indicating the jerk of which jerk suppression is relaxed to the acceleration control unit 17, without implementing jerk suppression (step S107). Now, examples of cases in which determination is made that the jerk suppression can be relaxed include when the reliability is relatively high and circumventing collision of the vehicle 1 with the vehicle traveling ahead with jerk suppression implemented will be difficult, and when determination is made that the behavior of the vehicle 1 will not become unstable when a relatively large braking force is applied to the vehicle 1.

When determination is made in the processing of step S106 that the jerk suppression cannot be relaxed (No in step S106), the jerk suppression implementation determining unit 16 implements jerk suppression and transmits a signal indicating the suppressed jerk to the acceleration control unit 17 (step S108). Now, examples of cases in which determination is made that the jerk suppression cannot be relaxed include when the reliability is relatively high and collision of the vehicle 1 with the vehicle traveling ahead can be circumvented with jerk suppression implemented, and when determination is made that the behavior of the vehicle 1 will become unstable when a relatively large braking force is applied to the vehicle 1.

In the processing of steps S107 and S108, the jerk indicated by the signal transmitted from the jerk suppression implementation determining unit 16 to the acceleration control unit 17 may be the jerk when decelerating the vehicle 1 this time, or may be a jerk restriction value. When information indicating the jerk restriction value is transmitted from the jerk suppression implementation determining unit 16 to the acceleration control unit 17, the acceleration control unit 17 can optionally set the acceleration within a range not exceeding this restriction value.

The acceleration control unit 17 controls acceleration to decelerate the vehicle 1, based on the jerk indicated by the information transmitted from the jerk suppression implementation determining unit 16 (step S109). Thereafter, when the end determining unit 18 determines that the deceleration assistance control is to be ended, the operations shown in FIG. 2 end.

Technical Aspects

When the vehicle traveling ahead decelerates while the vehicle 1 is traveling following the vehicle traveling ahead by following type ACC, the driver assistance device 100 decelerates the vehicle 1 so that the vehicle 1 does not come too close to the vehicle traveling ahead. The deceleration of the vehicle 1 by the driver assistance device 100 is automatically performed, irrespective of intent of the driver. Accordingly, jerk is suppressed so that the driver does not feel discomfort due to deceleration of the vehicle 1 by the driver assistance device 100.

For example, when the vehicle traveling ahead suddenly decelerates (in other words, suddenly brakes), or when another vehicle cuts in between the vehicle 1 and the vehicle traveling ahead, even though collision of the vehicle 1 and the vehicle traveling ahead can be circumvented by using suppressed jerk, there is a possibility that the driver will feel anxiety or discomfort due to the vehicle 1 coming close to the vehicle traveling ahead or another vehicle. Note that the other vehicle that has cut in can be regarded as a new vehicle traveling ahead, and accordingly the above other vehicle can be included in the concept of "vehicle traveling ahead".

Accordingly, configuring the vehicle 1 to decelerate as necessary, without suppressing jerk, is conceivable. However, there is a possibility that applying a relatively large braking force to the vehicle 1 without suppressing jerk will result in the behavior of the vehicle 1 becoming unstable, depending on road surface conditions or the like, for example. Conversely, the driver assistance device 100 takes into consideration the behavioral stability of the vehicle 1 as well, in addition to the relative relation between the vehicle 1 and the vehicle traveling ahead or another vehicle. Accordingly, according to the driver assistance device 100, the behavior of the vehicle 1 can be suppressed from becoming unstable due to the deceleration assistance control.

Suppressing jerk related to the deceleration assistance control improves the ride comfort of the vehicle 1, but there is a possibility that the occupant will feel anxiety due to the vehicle 1 coming close to the vehicle traveling ahead. On the other hand, not suppressing jerk related to the deceleration assistance control does improve the safety of the vehicle 1, but there is a possibility that occupants will feel discomfort due to deceleration of the vehicle 1 by the deceleration assistance control. The driver assistance device 100 can realize both of improved safety of the vehicle 1 and improved sense of security of the occupants, by switching between jerk suppression and relaxing of the suppression, based on the relative relation between the vehicle 1 and the vehicle traveling ahead, the behavior of the vehicle 1, and so forth.

Computer Program

Figure 3:
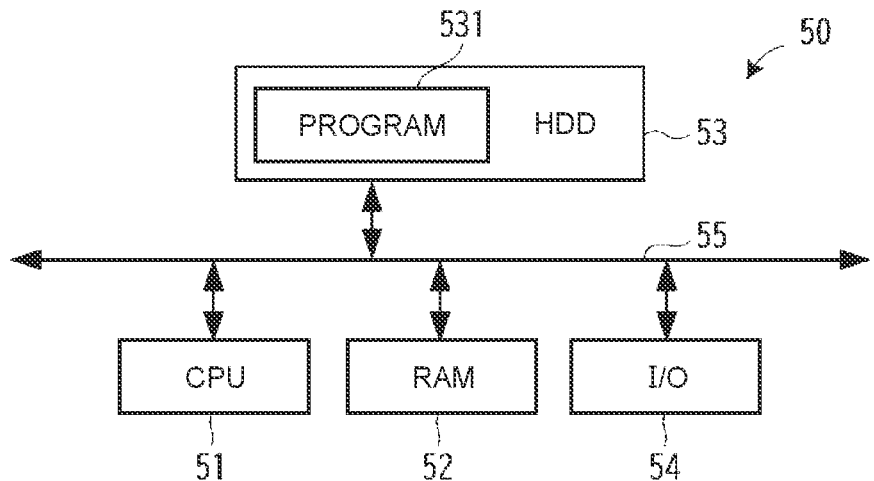
FIG. 3 is a block diagram illustrating a configuration of a computer according to the embodiment.

An embodiment relating to a computer program will be described with reference to FIG. 3. FIG. 3 is a block diagram illustrating a configuration of a computer according to the embodiment.

In FIG. 3, a computer 50 is configured including a central processing unit (CPU) 51, random-access memory (RAM) 52, a hard disk drive (HDD) 53, and an input/output (I/O) 54. The CPU 51, the RAM 52, the HDD 53, and the I/O 54 are connected to each other by a bus 55. A computer program 531 according to the present embodiment is stored in the HDD 53 in advance.

The processing of the CPU 51 by the computer program 531 will be described. The CPU 51 acquires measurement results that are taken by the sensors included in the sensor 20, for recognizing the external environment of the vehicle 1. The CPU 51 then recognizes the external environment of the vehicle 1. When vehicle traveling ahead is recognized through the recognition of the external environment, the CPU 51 computes leading-vehicle information (for example, reliability) related to the vehicle traveling ahead. The CPU 51 determines whether the behavior of the vehicle 1 will become unstable when a relatively large braking force is applied to the vehicle 1, either in parallel with or successively before or after the recognition of the external environment.

The CPU 51 computes the necessary deceleration in accordance with the relative relation between the vehicle 1 and the vehicle traveling ahead. At this time, the CPU 51 determines whether collision of the vehicle 1 with the vehicle traveling ahead can be circumvented when the deceleration of the vehicle 1 is changed to the above computed deceleration, with jerk suppression implemented and the jerk changed. The CPU 51 then determines whether to issue an alarm.

The CPU 51 determines whether the jerk suppression can be relaxed, based on at least one out of (i) reliability as an example of leading-vehicle information, (ii) determination results of whether the behavior of the vehicle 1 will become unstable, and (iii) determination results of whether collision of the vehicle 1 with the vehicle traveling ahead can be circumvented when jerk suppression is implemented and the jerk is changed.

When determination is made that jerk suppression can be relaxed, the CPU 51 controls acceleration and decelerates the vehicle 1 based on the jerk regarding which the jerk suppression is relaxed, without implementing jerk suppression. Conversely, when determination is made that jerk suppression cannot be relaxed, the CPU 51 controls acceleration and decelerates the vehicle 1 based on the suppressed jerk, with jerk suppression implemented.

Note that the computer program 531 may be stored in the HDD 53 by the computer 50 reading the computer program 531 from a recording medium like an optical disk such as compact disc read-only memory (CD-ROM) or the like, or Universal Serial Bus (USB) memory or the like, that stores the computer program 531, for example. Alternatively, the computer program 531 may be stored in the HDD 53 by the computer 50 downloading the computer program 531 over a network such as the Internet.

The computer program 531 can realize both of improved safety of the vehicle 1 and improved sense of security of the occupants, by switching between jerk suppression and relaxing of the suppression, based on the relative relation between the vehicle 1 and the vehicle traveling ahead, the behavior of the vehicle 1, and so forth, in the same way as the driver assistance device 100 described above.

Aspects of the disclosure derived from the embodiments described above will be described below.

The driver assistance device according to one aspect of the disclosure is a driver assistance device that automatically decelerates an own vehicle using a deceleration unit of the own vehicle in accordance with a relative relation between the own vehicle and a vehicle traveling ahead that is traveling forward of the own vehicle, the driver assistance device including a control unit for changing deceleration of the own vehicle by a first change amount, or a second change amount that is larger than the first change amount, when automatically decelerating the own vehicle, and an estimating unit for estimating whether behavior of the own vehicle will become unstable when the own vehicle is decelerated by the deceleration unit, wherein the control unit changes the deceleration by the first change amount when automatically decelerating the own vehicle, when the behavior of the own vehicle is estimated by the estimating unit to become unstable.

In the above-described embodiment, the "stable behavior determining unit 13", the "jerk suppression implementation determining unit 16" and the "acceleration control unit 17" correspond to an example of the "control unit", the "external environment recognition unit 11" corresponds to an example of the "estimating unit", and the "braking device 30" corresponds to an example of the "deceleration unit". In the above-described embodiment, "jerk when jerk suppression is implemented" corresponds to an example of "first change amount", and "jerk when jerk suppression is not implemented" corresponds to an example of "second change amount". The "own vehicle" is a vehicle in which the driver assistance device is installed, and is a different vehicle from the vehicle traveling ahead.

In the driver assistance device, the estimating unit may determine, in at least part of estimating whether the behavior of the own vehicle will become unstable by deceleration by the deceleration unit, whether the own vehicle is in a predetermined turning state, using a sensor that detects the motion state of the own vehicle, and the control unit may, when estimating that the behavior of the own vehicle will become unstable when determination is made that the own vehicle is in the predetermined turning state, change the deceleration by the first change amount when automatically decelerating the own vehicle.

In the driver assistance device, the estimating unit estimating whether the behavior of the own vehicle will become unstable due to decelerating by the deceleration unit may include estimating road surface conditions of the road on which the own vehicle is traveling, and the estimating unit may determine whether the behavior of the own vehicle will become unstable due to decelerating by the deceleration unit, based on one of (i) whether a friction coefficient of the road surface as the road surface conditions is no more than a predetermined value, (ii) whether under a predetermined weather condition, and (iii) whether a curve is present forward of the own vehicle.

A driver assistance method according to an aspect of the disclosure is a driver assistance method of a driver assistance device that automatically decelerates an own vehicle using deceleration unit of the own vehicle in accordance with a relative relation between the own vehicle and a vehicle traveling ahead that is traveling forward of the own vehicle, and changes deceleration of the own vehicle by a first change amount, or a second change amount that is larger than the first change amount, when automatically decelerating the own vehicle, and includes an estimating process of estimating whether behavior of the own vehicle will become unstable due to decelerating by the deceleration unit, and a control process of changing the deceleration by the first change amount when automatically decelerating the own vehicle, when the behavior of the own vehicle is estimated in the estimating process to become unstable.

In the driver assistance method, determining may be performed in the estimating process regarding whether the own vehicle is in a predetermined turning state, using a sensor that detects the motion state of the own vehicle, as estimation of whether the behavior of the own vehicle will become unstable due to decelerating by the deceleration unit, and when determination is made in the control process that the own vehicle is in the predetermined turning state as when estimating that the behavior of the own vehicle will become unstable, the deceleration may be changed by the first change amount when automatically decelerating the own vehicle.

In the driver assistance method, the estimating process may include estimating road surface conditions of the road on which the own vehicle is traveling, and the estimating process may determine whether the behavior of the own vehicle will become unstable due to decelerating by the deceleration unit, based on one of (i) whether a friction coefficient of the road surface as the road surface conditions is no more than a predetermined value, (ii) whether under a predetermined weather condition, and (iii) whether a curve is present forward of the own vehicle.

A computer program according to one aspect of the disclosure causes a computer of a driver assistance device that automatically decelerates an own vehicle using deceleration unit of the own vehicle in accordance with a relative relation between the own vehicle and a vehicle traveling ahead that is traveling forward of the own vehicle, to function as control unit for changing deceleration of the own vehicle by a first change amount, or a second change amount that is larger than the first change amount, when automatically decelerating the own vehicle, and estimating unit for estimating whether behavior of the own vehicle will become unstable due to decelerating by the deceleration unit, wherein the control unit changes the deceleration by the first change amount when automatically decelerating the own vehicle, when the behavior of the own vehicle is estimated by the estimating unit to become unstable.

The disclosure is not limited to the above-described embodiment, and can be appropriately modified without departing from the essence or spirit of the disclosure that can be read from the claims and the entire specification, and a driver assistance device and method, and a computer program with such modifications, are also within the technical scope of the disclosure.

What is claimed is:

1. A driver assistance device, comprising a processor configured to:
    automatically decelerate an own vehicle in accordance with a relative relation between the own vehicle and a vehicle traveling ahead that is traveling forward of the own vehicle;
    change deceleration of the own vehicle by a first change amount, or a second change amount that is larger than the first change amount, when automatically decelerating the own vehicle;
    perform behavioral determination to estimate whether behavior of the own vehicle will become unstable when the own vehicle is automatically decelerated;
    maintain the deceleration of the own vehicle by the second change amount when automatically decelerating the own vehicle, when the behavior of the own vehicle is estimated to not become unstable; and
    change the deceleration by the first change amount when automatically decelerating the own vehicle, when the behavior of the own vehicle is estimated to become unstable.

2. The driver assistance device according to claim 1, wherein the processor is configured to:
    determine, in at least part of the behavioral determination, whether the own vehicle is in a predetermined turning state, using a sensor that detects a motion state of the own vehicle; and
    estimate that the behavior of the own vehicle will become unstable when determination is made that the own vehicle is in the predetermined turning state, and change the deceleration by the first change amount when automatically decelerating the own vehicle.

3. The driver assistance device according to claim 1, wherein the processor is configured to include estimating conditions of a road on which the own vehicle is traveling in the behavioral determination, estimating the conditions of the road on which the own vehicle is traveling being to determine whether the behavior of the own vehicle will become unstable when automatically decelerating the own vehicle, based on one of
 (i) whether a friction coefficient of a road surface of the road is equal to or less than a predetermined value,
 (ii) whether an external environment of the own vehicle is under a predetermined weather condition, and
 (iii) whether a curve is present forward of the own vehicle.

4. The driver assistance device according to claim 1, wherein the first change amount is a first time derivative of acceleration.

5. A driver assistance method for a vehicle that is configured to automatically decelerate the vehicle in accordance with a relative relation between the vehicle and a vehicle traveling ahead that is traveling forward of the vehicle, and change deceleration of the vehicle by a first change amount, or a second change amount that is larger than the first change amount, when automatically decelerating the vehicle, the driver assistance method comprising:
 estimating whether behavior of the vehicle will become unstable when the vehicle automatically decelerates;
 maintaining the deceleration of the vehicle by the second change amount when automatically decelerating the vehicle, when the behavior of the vehicle is estimated to not become unstable; and
 changing the deceleration by the first change amount when automatically decelerating the vehicle, when the behavior of the vehicle is estimated to become unstable.

6. The driver assistance method according to claim 5, further comprising determining whether the vehicle is in a predetermined turning state, using a sensor that detects a motion state of the vehicle, wherein the behavior of the vehicle is estimated to become unstable when determination is made that the vehicle is in the predetermined turning state.

7. The driver assistance method according to claim 5, wherein estimating whether the behavior of the vehicle will become unstable when the vehicle automatically decelerates includes estimating conditions of a road on which the vehicle is traveling, estimating the conditions of the road on which the vehicle is traveling being to determine whether the behavior of the vehicle will become unstable when automatically decelerating the vehicle, based on one of
 (i) whether a friction coefficient of a road surface of the road is no more than a predetermined value,
 (ii) whether an external environment of the vehicle is under a predetermined weather condition, and
 (iii) whether a curve is present forward of the vehicle.

8. A non-transitory computer-readable storage medium storing a program that, when executed by a processor of a driver assistance device configured to automatically decelerate a vehicle in accordance with a relative relation between the vehicle and a vehicle traveling ahead that is traveling forward of the vehicle, causes the driver assistance device to:

change deceleration of the vehicle by a first change amount, or a second change amount that is larger than the first change amount, when automatically decelerating the vehicle;
estimate whether behavior of the vehicle will become unstable when the vehicle automatically decelerates;
maintain the deceleration of the vehicle by the second change amount when automatically decelerating the vehicle, when the behavior of the vehicle is estimated to not become unstable; and
change the deceleration by the first change amount when automatically decelerating the vehicle, when the behavior of the vehicle is estimated to become unstable.

9. The driver assistance device according to claim 1, wherein the processor is further configured to:
 compute an index indicating certainty that the vehicle traveling ahead is present as a leading vehicle information; and
 determine a reliability of the leading vehicle information based on:
  whether the vehicle traveling ahead is detected by a plurality of types of sensors of the own vehicle included in the sensor;
  whether the vehicle traveling ahead is continuously detected by the at least one sensor of the own vehicle; and
  whether the vehicle traveling ahead is continuously a control object for the deceleration assistance control.

10. The driver assistance method according to claim 5, further comprising:
 computing an index indicating certainty that the vehicle traveling ahead is present as a leading vehicle information; and
 determining a reliability of the leading vehicle information based on:
  whether the vehicle traveling ahead is detected by a plurality of types of sensors of the own vehicle included in the sensor;
  whether the vehicle traveling ahead is continuously detected by the at least one sensor of the own vehicle; and
  whether the vehicle traveling ahead is continuously a control object for the deceleration assistance control.

11. The non-transitory computer-readable storage medium according to claim 8, wherein the processor is further configured to causes the driver assistance device to:
 compute an index indicating certainty that the vehicle traveling ahead is present as a leading vehicle information; and
 determine a reliability of the leading vehicle information based on:
  whether the vehicle traveling ahead is detected by a plurality of types of sensors of the own vehicle included in the sensor;
  whether the vehicle traveling ahead is continuously detected by the at least one sensor of the own vehicle; and
  whether the vehicle traveling ahead is continuously a control object for the deceleration assistance control.

\* \* \* \* \*